(No Model.)
W. J. BOTTS.
VEHICLE BRAKE.
No. 503,897. Patented Aug. 22, 1893.
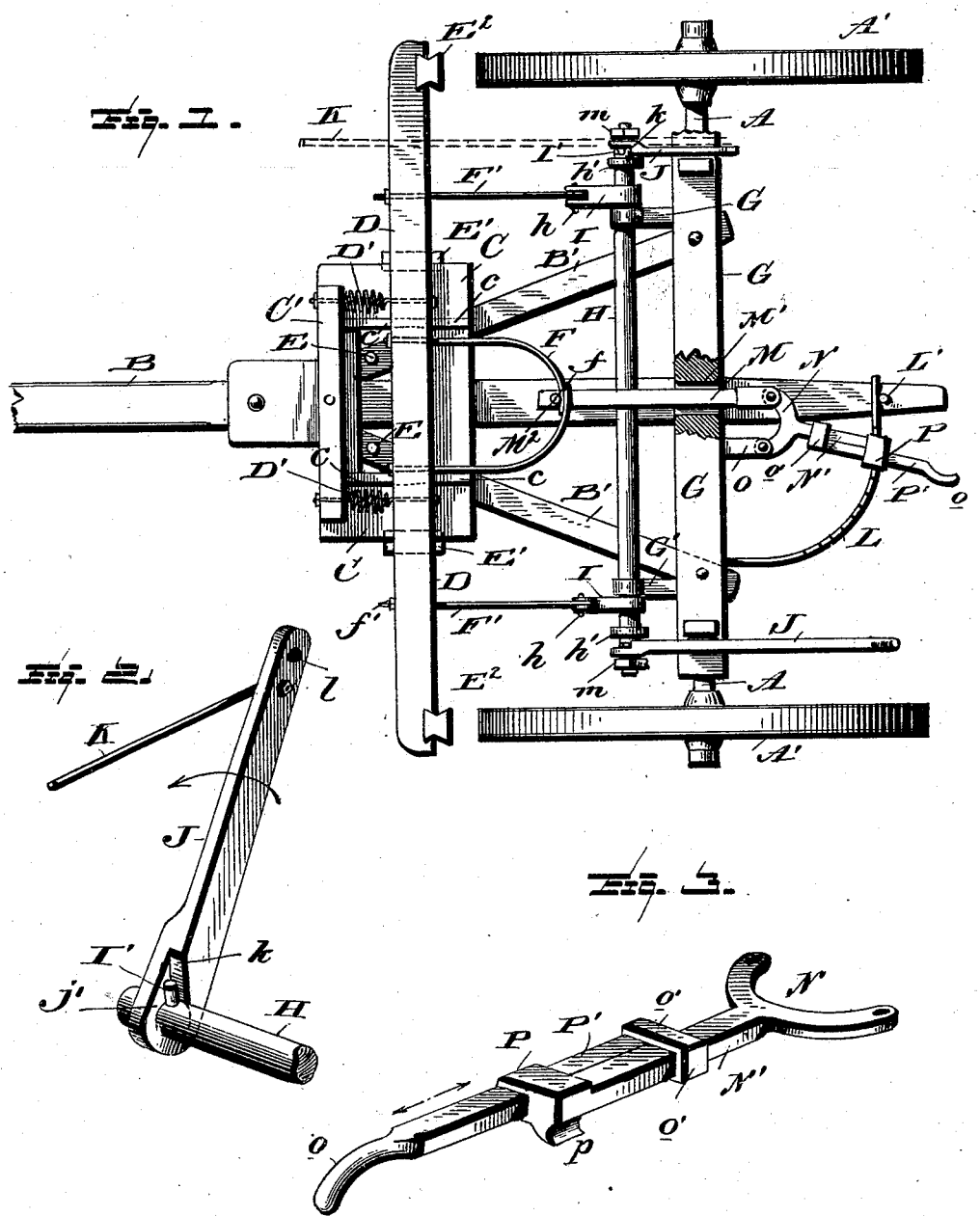
Witnesses:
L. C. Hills.
E. S. Trull.
Inventor
Winfield J. Botts,
by Franklin H. Hough
Attorney

UNITED STATES PATENT OFFICE.

WINFIELD J. BOTTS, OF WEBSTER, MARYLAND.

VEHICLE-BRAKE.

SPECIFICATION forming part of Letters Patent No. 503,897, dated August 22, 1893.

Application filed April 25, 1893. Serial No. 471,789. (No model.)

*To all whom it may concern:*

Be it known that I, WINFIELD J. BOTTS, a citizen of the United States, residing at Webster, in the county of Harford and State of Maryland, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in wagon brakes, and it has for its objects among others to provide a simple and cheap yet effective brake and means whereby the same may be operated from the side, from the front or from the rear of the wagon.

The means provided for operating the brake from the rear is adjustable so that normally it will be under the wagon out of the way, but when it is desired to apply the brake the lever which is extensible is pulled out; one part is provided with a pawl which is adapted to engage a notched segment or rack bar to hold the brakes in position.

Other objects and advantages of the invention will hereinafter appear and the novel features thereof will be specifically defined by the appended claims.

The invention in the present instance resides in the peculiar combinations, and the construction, arrangement and adaptation of parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 1 is a perspective view of my improvements in wagon brakes. Fig. 2 is a detail of one of the levers showing the shoulder and cut away portion thereof. Fig. 3 is a detail of the rear extensible lever.

Like letters of reference indicate like parts throughout the several views in which they appear.

Referring now to the details of the drawings by letter, A designates the hind axle and A' the hind wheels all of known or approved construction.

B is the reach and B' the hounds, also of known construction.

Supported on the hounds and reach is a platform C having the raised portions or ribs c extending in the direction of the length of the reach and upon which the sliding brake bar is designed to slide, the ribs raising the said bar from contact with the platform except upon the ribs.

At the front end of the platform and upon the upper face thereof is secured a cross plate C' between the rear face of which and the front face of the brake-bar D are the springs D' as seen best in Fig. 1. These springs may be of any desired kind and connected or secured in position in any well known way.

To opposite ends of the brake bar are secured the brake shoes $E^2$ which are of usual construction. Depending from the brake bar are the guide hooks E' which embrace the ends of the platform as shown and serve to guide the brake bar and keep it in parallel relation with the cross plate and also prevent upward displacement of the brake bar.

E are stop pins rising from the hounds and passing through an opening in the platform and serve to limit the forward movement of the brake bar as will be readily understood from reference to Fig. 1.

F is a bail or loop secured in the rear face of the brake bar and extending rearward as shown, being provided with a coil or eye *f* for a purpose which will soon be made apparent. Near each end of the brake bar is rod or link F' secured thereto in any suitable manner, preferably by being extended through the bar and provided with a nut *f'* whereby it may be tightened when necessary. The rear ends of these rods or links are hooked as shown for detachable engagement with the crank arms on the crank shaft as will hereinafter appear.

G is the rear bolster. Projecting from the front side thereof near each end is an eye bolt G' in which is journaled the shaft H on which are the crank arms I the front ends of which are bifurcated and in the bifurcations are held the cross pins *h* over which the hooked ends of the rods or links F' are engaged as shown. The ends of this shaft are screw threaded and near the crank arms it is provided with the collars h' between which and the ends of the shaft are the pins I'.

J are hand levers sleeved upon the shaft between the collars and the ends of the shaft and these levers are of peculiar construction, being provided with an opening j for the reception of the shaft and with a halved out portion j' with a shoulder k as shown; the shoulder engages the pin I' so that when the lever is turned the shoulder will by its engagement with the pin turn the rock shaft and apply the brakes. This cut away portion and shoulder permit of the operation of the brake by either of the means provided therefor without interference of any of the others as will be readily understood from Fig. 1. One of the levers is longer than the other and is designed to be operated from the side of the wagon; the other is provided with a hole or holes l for the adjustable connection of a rod or cord K which is designed to extend to and be connected with another lever at the front of the wagon so that the brakes may be applied from the driver's seat. Nuts m are provided upon the ends of the rock shaft to detachably hold the levers thereon.

In order that the brakes may be applied from the hind end of the wagon I have provided the following mechanism.

L is a curved rack bar having one end held in the rear bolster and its other end provided with a loop or opening which encircles the rear end of the reach, being held thereon by a pin L' as shown.

M is a bar arranged to slide through an opening M' in the rear bolster and at its forward end passed through the loop or eye of the bail or loop F as shown and provided forward of the said eye with a vertical pin M² which engages the said eye. The rear end of this bar M is bifurcated and has pivotally connected therewith one end of the curved portion N of the operating lever N', the other end of the curved portion being pivotally connected with the bifurcated arm O held in the rear bolster. This lever has a loop portion P through which passes the lever-arm P' which has a handle portion o and a loop o' to embrace the lever N' as shown so that the parts may be extended one upon the other to increase the leverage or to enable the brakes to be applied from a greater or less distance from the hind end of the wagon; the loop of the lever N' has thereon a pawl or tooth p which engages the curved rack bar to hold the brakes on.

The operation will be readily understood from the foregoing description when taken in connection with the annexed drawings, and a further detailed description thereof is not deemed necessary.

Modifications in detail may be resorted to without departing from the spirit of the invention or sacrificing any of its advantages.

What I claim as new is—

1. The combination with the rear axle, reach and hounds, of a brake bar with brake shoes, the spring connected therewith, the rock shaft, the arms thereon, the bail secured to the brake-bar and having an eye the connections between the arms and the eye of the bail and means for operating the brake bar from either the side, front or rear of a wagon, as set forth.

2. The combination with the brake bar with its brake shoes, of the hounds the platform with its ribs, the cross plate, the stop pins rising from the hounds between the brake-bar and cross-plate, and the rock shaft connected with the brake bar and provided with means for operating the same, as set forth.

3. The combination with the brake bar and the rock shaft connected therewith and provided with a pin, of a lever sleeved on the shaft and having a cut away portion and a shoulder to engage said pin, substantially as and for the purpose specified.

4. The combination with the brake bar, the platform with its ribs, the guide hooks on the brake bar, the springs, the stop pins, and the rock shaft with its crank arms, of the connections between said arms and brake bar, and the levers on the rock shaft having a shoulder to engage a pin on the shaft, substantially as and for the purpose specified.

In testimony whereof I affix my signature in the presence of two witnesses.

WINFIELD J. BOTTS.

Witnesses:
HENRY W. EARL,
J. W. FOSTER.